Figure 1:
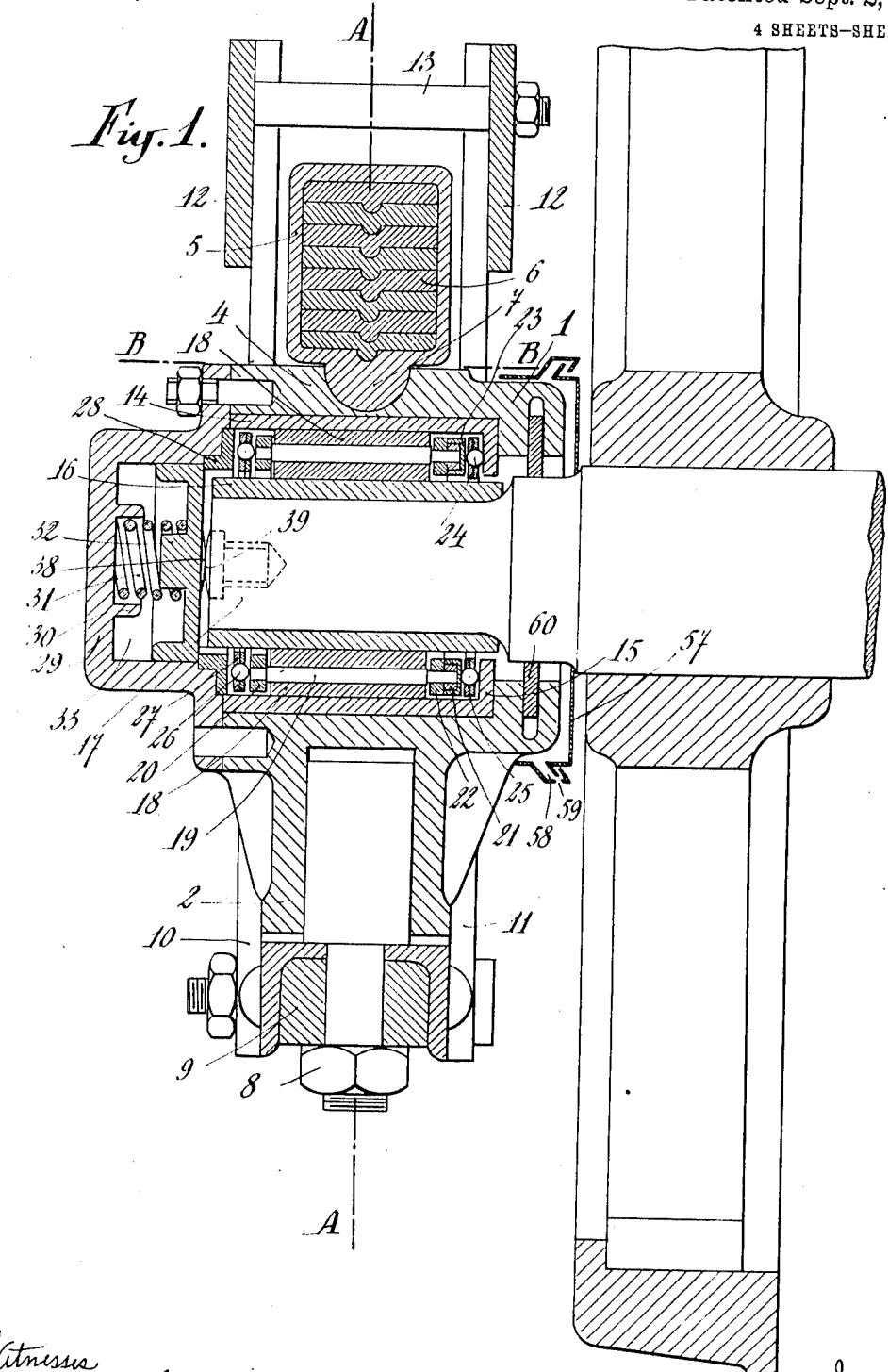

A. DEHU.
GREASE BOX FOR THE AXLES OF VEHICLES.
APPLICATION FILED NOV. 28, 1911.

1,071,989.

Patented Sept. 2, 1913.

4 SHEETS—SHEET 1.

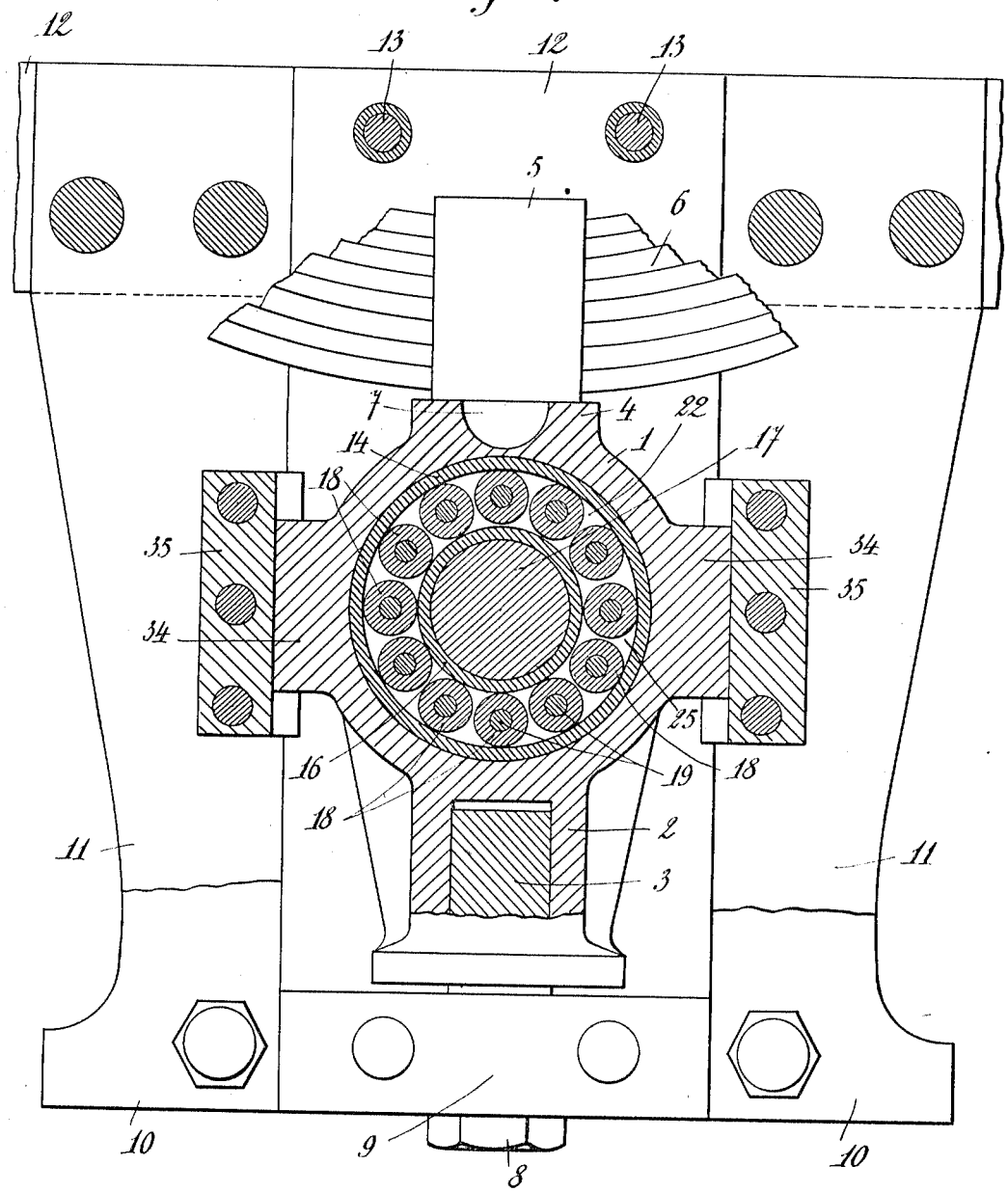

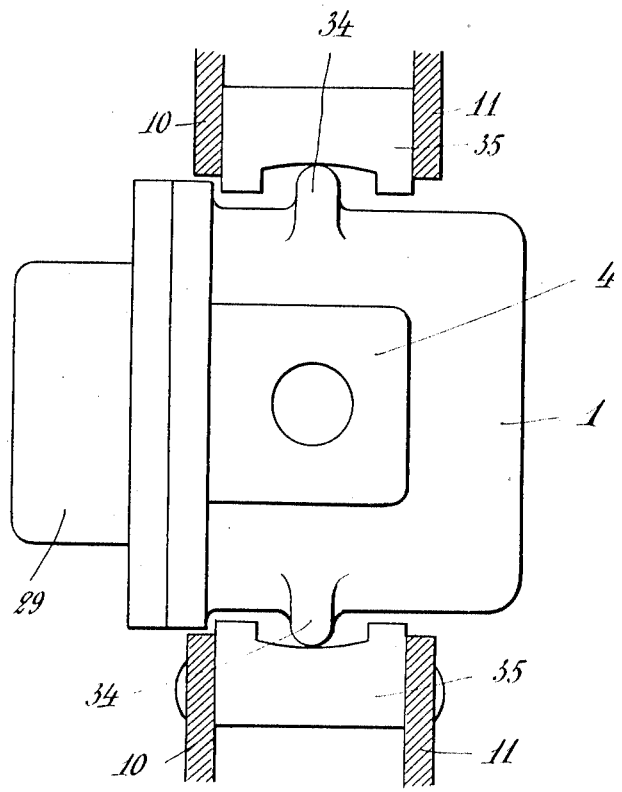

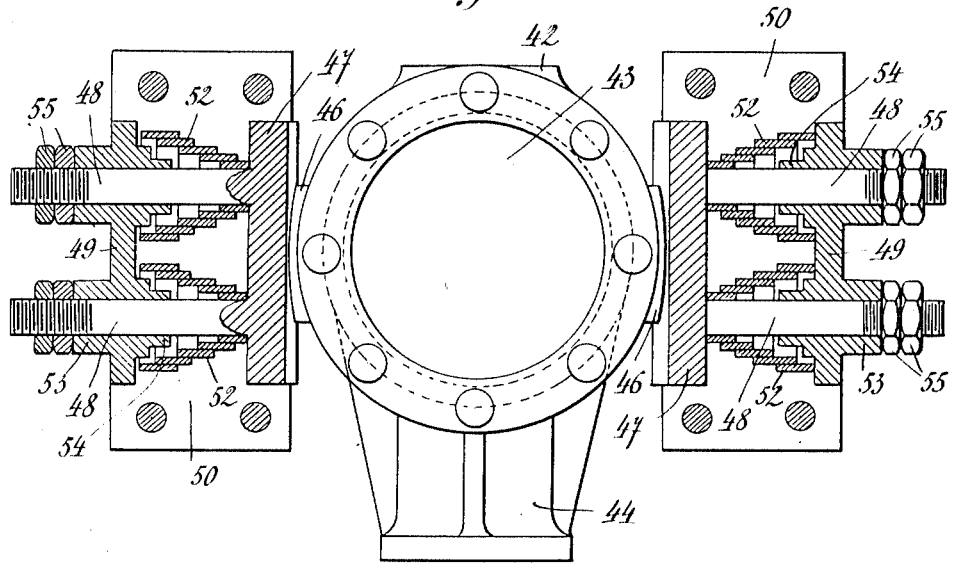
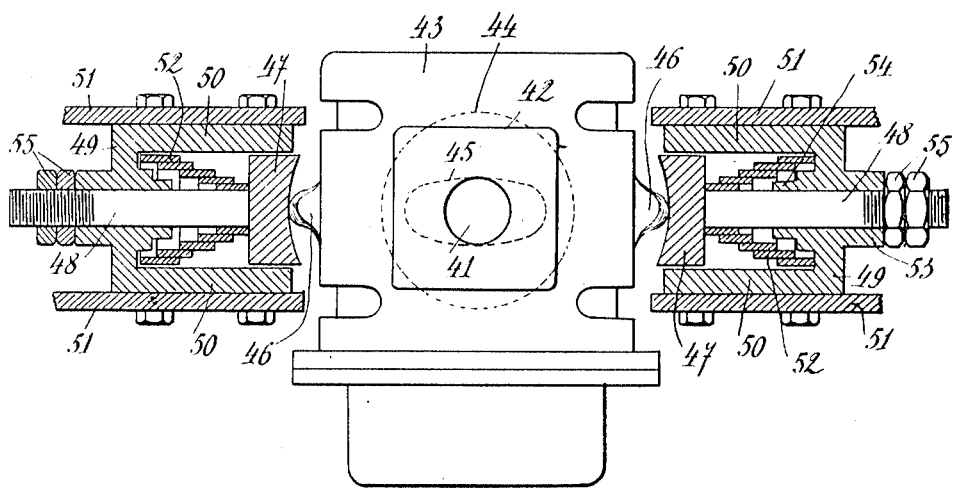

UNITED STATES PATENT OFFICE.

ARTHUR DEHU, OF BRUSSELS, BELGIUM.

GREASE-BOX FOR THE AXLES OF VEHICLES.

1,071,989.    Specification of Letters Patent.    Patented Sept. 2, 1913.

Application filed November 28, 1911. Serial No. 662,802.

*To all whom it may concern:*

Be it known that I, ARTHUR DEHU, a subject of the King of the Belgians, and resident of Brussels, Belgium, have invented a certain new and useful Improvement in Grease-Boxes for the Axles of Vehicles, of which the following is a specification.

It is known that in vehicles running on rails the rapid wear of the bearings of the axle journals is principally due to the considerable friction which is produced by the curves in the track, especially when these curves are of small radius. It is on account of such friction that anti-friction roller bearings are not generally used in these vehicles, as these bearings are rapidly put out of use owing to deformation due to the crushing of the bearings.

The present invention has for its object to avoid this friction, by increasing the strength of the bearings and permitting the application of roller bearings, the use of which will produce a considerable economy in driving power.

The invention consists essentially in constructing the grease boxes inclosed in the bearings in such manner that, when the vehicle is rounding curves, they are able to follow the angular displacement of the axles relatively to the body of the vehicle. To this end the grease boxes are mounted on two pivots, which permit them to swing around their vertical axis.

In vehicles provided with guard plates for the wheels and in which the springs have at their lower side a semi-spherical block of steel, said block forms the upper pivot for which a hemispherical cavity is provided in the upper part of the grease box, and the lower pivot may be carried by a small cross bar secured to and connecting the two guard plates under the grease box. When the guard plates are each provided with two plates separated one from the other by a free space, the grease box may further be provided with lateral lugs intended to be housed in this space and by transverse members of suitable form adapted to be secured between the two plates in order to serve as guides for these lugs. It will be understood that this arrangement will permit of a sufficient pivoting of the grease boxes for rendering possible the use of roller bearings, these latter being preferably constructed in such manner as to avoid the wedging of the wheels under the action of longitudinal thrusts from the axle, and with this object in view the present invention comprises further a type of bearing in which the ends of the rollers bear on balls arranged circumferentially which form ball bearings for the rollers themselves. On the other hand springs arranged between the ends of the journals of the axle and the front wall of the grease boxes, are provided to deaden or absorb the longitudinal thrusts of the axle and afterward to return it into position.

In the annexed drawings Figures 1, 2 and 3 show by way of example an embodiment of the invention applied to a grease box of a vehicle, the wheels of which are provided with double guard plates. Figs. 4 and 5 show a modification of the invention. Fig. 1 is a central vertical section of the grease box and of the connected members. Fig. 2 is a transverse section on the line A—A of Fig. 1. Fig. 3 is a horizontal section on the line B—B Fig. 1, the suspension spring being removed. Fig. 4 is a front view of the grease box with the bearings for the springs shown in longitudinal vertical section, and Fig. 5 is a plan view with the bearings in horizontal section.

The grease box 1 (Figs. 1, 2 and 3) of cylindrical or approximately cylindrical form is provided at the lower part with an extension in the form of a socket 2, which engages a pivot guide 3, and it is provided at its upper part with an enlargement 4 on which rests the clamp 5 of the suspension spring 6. This member 5 is provided on its lower surface with a semi-spherical projection 7 which enters into an opening of the same shape provided in the enlargement 4 of the grease box. The pivot guide 3 is provided with a cylindrical prolongation of less diameter, the lower end of which is threaded in order to be able to receive a nut 8 serving to secure the pivot to a cross piece 9 connected to the guard plates. These are formed of two pairs of plates 10 and 11 connected together at the lower part by the cross piece 9 and at the upper part by the ends of bearers 12 arranged outside and held together by bolts 13.

At the interior of the box 2 is introduced a bush 14 of cast steel which is exactly adjusted to the inner cylindrical wall of the box and is provided with an annular flange 15 which projects toward the interior. A second bush 16 of the same quality of steel, is placed on the journal 17 of the axle. Between these two bushes 14 and 16 are arranged a series of rollers 18, the axles 19 of which have their ends threaded so that they may be screwed at one end into tapped or threaded holes, provided in a ring 20 and receive at the other end nuts 21 serving for securing them to a ring 22 through holes in which they pass freely. The nuts 21 are introduced into a series of corresponding holes in a ring 23, the outer face of which serves as a rolling surface for a ring of balls 24 carried by two annular juxtaposed disks 25. The outer face of the ring 20 also serves as a rolling surface for a ring of balls 26 also carried by two annular juxtaposed disks 27 and bearing against the vertical edge of the ring 28. The box is closed by a cap 29 provided internally with a socket 30 in which is secured one of the ends of a spiral spring 31, the other end of which is provided with a shock preventing piston 32 exactly adjusted in the cylindrical housing 33 formed by the cap 29. This piston 32 serves, in conjunction with the spring 31, to deaden the longitudinal thrust of the axle when the vehicle is rounding curves, by compressing the air inclosed within the housing 33. Further, the piston 33 has a member 38 of spherical form which, during this thrust, bears against an abutment 39 of the same form provided on the corresponding face of the journal. This arrangement prevents friction and the very injurious action experienced when rounding curves. In the case of longitudinal thrust of the axle in one direction or the other, the ends of the rolling axles 19 bear against the balls 24 or 26 which permit the operation of the rollers 18 without any wedging.

The axis of the pivot guide 3 and the center of the spherical portion 7 are in the same vertical line which constitutes the pivotal axis around which the grease box may rotate when the vehicle is rounding curves in order to follow the angular displacement of the axles relatively to the body of the vehicle. Owing to this pivoting of the grease box, the roller 18 invariably remains parallel to the journal of the axle, which prevents deformation by crushing, the grease box remaining in an exactly vertical position during this movement on account of the presence of the pivot guide 3 at its lower part. Supplementary guide means may further be provided on each side of the grease box consisting of semi-cylindrical projections 34 formed integral with the lateral walls thereof and operating with a sufficient play in corresponding housings formed in the transverse members 35 secured between the guard plates. This arrangement serves to guide the grease box in its upward and downward movements permitting it to pivot about a vertical axis, this latter constituting the axis of the cylindrical surface of the housing for the members 35.

In the embodiment shown in Figs. 4 and 5 the grease box is constructed in such manner that the axles may be inclined relatively to the axis of the vehicle when rounding curves. With this object the opening formed at the upper part of the grease box for receiving the spherical portion of the clamp for the suspension springs as well as the housing at the lower part of the box in which is introduced the fixed pivot solid with the body of the vehicle, have an elliptical form, the major axis of which is directed in the longitudinal direction of the vehicle, in order to permit lateral displacement of the grease boxes. Further spring abutments are arranged between the guard plates on each side of the grease boxes for absorbing the thrusts of the axle, to limit the lateral movements of the grease boxes and to thereafter bring these latter as well as the axle into their normal positions. These spring abutments have again the advantage of absorbing shocks caused by the starting of the vehicle.

The cavity 41, provided in the enlarged portion 42 at the upper part of the grease box 43 and the housing 45 of the socket 44, at the lower part of the grease box, intended to receive the pivots of this box, each have an elliptic form, for enabling the box to turn laterally on the pivots, by rotating around this, when the axle is inclined relatively to the body of the vehicle. The grease box 43, preferably cylindrical in form, is provided with lateral lugs 46 slightly curved which bear against disks 47 provided at their rear part with spindles 48 adapted to slide in openings in the base 49 of both clamps the lateral cheeks 10 of which are secured to the guard plate 51. Each disk 47 is preferably provided with two spindles 48 disposed one above the other and surrounded by helicoidal springs 52 bearing at one end against the rear face of the disk and at the other end carried in bearings in the base of the clamp or stirrup which is arranged with steps 53 and 54 in order to serve as guides for the springs 52. The ends of the spindles 48 are threaded and carry lock nuts 55 which permit of adjusting the tension of the springs 52 in order that these latter always maintain the disks 47 in contact with the lugs 46 whatever be the lateral movement of the grease box.

In order to insure a perfect tightness of the box there are provided as shown in Fig. 1 two members 57 and 58 of sheet metal, one, 57, of which is secured to the hub of the wheel turning with it, and the other, 58, on the body of the box. This latter is perforated at its lower part with an opening 59 for carrying away any water which may have been introduced into the receptacle formed by the members 57 and 58. It will be seen that the form of these members is such that they have between them a space from which the water is always expelled through the opening 59 aforesaid. For providing against any eventuality a supplementary joint is formed between the box and the axle, said joint being constituted by a disk of leather or any other material.

I claim:

1. A grease box for the axle of vehicles, comprising, in combination, a box body, having a hemi-spherical cavity formed in the upper part thereof, a hemi-spherical member projecting from the suspension means for the vehicle body, and engaging said cavity, a cylindrical socket formed in a lower prolongation of said box, guard plates fixed to a suitable part of the car body, and a cylindrical member, fixed in transverse members between said guard plates, and engaging said socket, the depth of the socket being greater than that of the cylindrical member.

2. A grease box for the axle of vehicles, comprising, in combination, a box body, having a hemi-spherical cavity formed in the upper part thereof, a hemi-spherical member projecting from the suspension means for the vehicle body, and engaging said cavity, a cylindrical socket formed in a lower prolongation of said box, guard plates fixed to a suitable part of the car body, a cylindrical member, fixed in transverse members between said guard plates, and engaging said socket, the depth of the socket being greater than that of the cylindrical member, there being cavities in said guard plates, and semi-cylindrical lugs, formed on the lateral walls of said box, and engaging said last named cavities.

3. A grease box for the axle of vehicles, comprising, in combination, a box body, having a hemi-spherical cavity formed in the upper part thereof, a hemi-spherical member projecting from the suspension means for the vehicle body, and engaging said cavity, a cylindrical socket formed in a lower prolongation of said box, guard plates fixed to a suitable part of the car body, a cylindrical member, fixed in transverse members between said guard plates, and engaging said socket, the depth of the socket being greater than that of the cylindrical member, there being cavities in said guard plates, semi-cylindrical lugs, formed on the lateral walls of said box, and engaging said last named cavities, rollers inside of said box, around the vehicle axle, axes on which said rollers are free to rotate, rings in which the ends of said axes are secured, rings arranged on each side and outside of said first named rings, and balls located in said rings, between the first named rings and the box wall.

4. A grease box for the axle of vehicles, comprising in combination, a box body having a hemi-spherical cavity formed in the upper part thereof, a hemi-spherical member projecting from the suspension means for the vehicle body, and engaging said cavity, a cylindrical socket formed in a lower prolongation of said box, guard plates fixed to a suitable part of the car body, a cylindrical member, fixed in transverse members between said guard plates, and engaging said socket, the depth of the socket being greater than that of the cylindrical member, there being cavities in said guard plates, semi-cylindrical lugs, formed on the lateral walls of said box, and engaging said last named cavities, rollers inside of said box, around the vehicle axle, axes on which said rollers are free to rotate, rings in which the ends of said axes are secured, rings arranged on each side, outside of said first named rings, balls located in said rings, between the first named rings and the box wall, a cap for the box body and a spring-pressed piston, inside of said cap, and bearing on the end of the axle.

5. A grease box for the axle of vehicles, comprising, in combination, a box body, having a hemi-spherical cavity formed in the upper part thereof, hemi-spherical means projecting from the suspension means for the vehicle body, and engaging said cavity, a cylindrical socket formed in a lower prolongation of said box, guard plates fixed to a suitable part of the car body, a cylindrical member, fixed in transverse members between said guard plates, and engaging said socket, the depth of the socket being greater than that of the cylindrical member, spring-pressed members, located in said guard plates, there being cavities in said spring-pressed members, and semi-cylindrical lugs, formed on the lateral wall of said box, and engaging said last named cavities.

6. A grease box for the axle of vehicles, comprising, in combination, a box body having an elliptical cavity formed in the upper part thereof, a hemi-spherical member, projecting from the suspension means for the vehicle body and engaging said cavity, a socket of elliptical section, formed in a lower prolongation of said box, guard plates fixed to a suitable part of the car body, and a cylindrical member, fixed in transverse members between said guard plates, and engaging said socket, the depth of the socket being greater than that of the cylindrical member.

In testimony whereof I have signed my name to this specification in the presence of two subscribing witnesses.

ARTHUR DEHU.

Witnesses:
COLLIND,
CHAS. ROY NASMITLE.

Copies of this patent may be obtained for five cents each, by addressing the "Commissioner of Patents, Washington, D. C."